United States Patent Office 3,816,485
Patented June 11, 1974

3,816,485
METHOD OF SYNTHESIZING FATTY ACID ESTERS
Joseph R. Wechsler, Chicago, Ill., assignor to Stepan Chemical Company, Northfield, Ill.
No Drawing. Continuation-in-part of application Ser. No. 655,590, July 24, 1967, now abandoned. This application Nov. 13, 1970, Ser. No. 89,491
Int. Cl. C07c 51/22, 67/02
U.S. Cl. 260—410.9 R                 16 Claims

ABSTRACT OF THE DISCLOSURE

A process of manufacturing synthetic fatty acid $C_1$–$C_6$ esters from straight-chain hydrocarbons by catalytic oxidation wherein a reaction cycle is employed that reduces over-oxidation and molecular degradation so as to provide higher yields and reduce impurities. Relatively pure fatty acid esters are recovered from the crude oxidation products by a plurality of alternative purification methods utilizing saponification, hydrogenation, polyol esterification processes as well as extraction processes to reduce the contaminants in the ultimate product so as to yield substantially pure products.

CROSS-REFERENCE TO RELATED APPLICATION

This is a continuation-in-part application of my copending U.S. Ser. No. 655,590 filed July 24, 1967 (now abandoned).

BACKGROUND OF THE INVENTION

Field of the invention

The present invention relates to a process of manufacturing synthetic fatty acid esters. More specifically, the invention relates to a process of oxidizing straight-chain hydrocarbons wherein the majority of the products will be of a carboxylic nature and to a process of purifying the relatively crude carboxylic oxidation product recovered from such a process to obtain a relatively pure synthetic fatty acid ester.

Description of the prior art

Oxidation of aliphatic hydrocarbons to form organic carboxylic substances is generally one of the oldest organic reactions known. This reaction has not been changed significantly since it was first discovered. In principle, the reaction comprises reacting petroleum wax or some other aliphatic hydrocarbon with an oxygen source at high temperatures, in the presence of a catalyst. Generally, the catalyst utilized is a compound of a polyvalent metal, such as manganese and/or cobalt and the oxygen source is generally air. The present day process as set forth above suffers from a number of serious drawbacks. The fatty acid materials formed by the known reaction process are subjected to over-oxidation, which is conductive to the formation of not only poly-functional compounds but also to substantial molecular degradation, which prevents the formation of high molecular weight fatty acid materials. In addition, the catalyst used in the known processes create a number of problems in the efficient removal and recovery of such catalysts. Moreover, these catalysts tend to form undesirable by-products, such as heavy metal soaps and/or various cationic complexes which in turn are extremely difficult to remove from the desired end product. Further, the nature of the air input in the known process is such that a considerably excessive amount of volatile materials are entrained therein and thereby substantially reduce the ultimate yield. Various attempts to capture these volatile products are made, however, they all require the utilization and installation of highly efficient and costly scrubbing equipment.

Generally, the formed carboxylic compounds obtained from such an oxidation reaction are conventionally removed by treatment with an alkali. This removal process is generally performed as a high temperature saponification of the oxidate products so that the obtained water solution contains not only carboxylic soaps, but also a large number of unreacted or partially reacted hydrocarbons, i.e. paraffins, as well as other various impurities, making subsequent purification very difficult and/or uneconomical.

In accordance the heretofore known procedure, the crude carboxylic oxidation product obtained by saponification of an oxidate of various paraffin materials contain a substantial amount of impurities, generally ranging from about 20% to about 40%, depending primarily on the method employed for its manufacture. These impurities consist of unreacted hydrocarbons, alcohols carbonylic compounds, lactones, various polyfunctional compounds and other less identifiable compounds. Various means for removal of these impurities are known. The most common known method is based on solvent extraction of the crude soap solution. This method is disadvantageous in that it necessitates the recovery of the solvent for economical utilization thereof. Moreover, the solvents used are always at least partially soluble in the soap solutions so that they have to be removed from the product as well as from the extract. Of course, this complicates not only the recovery of the solvents but also the purification of the products. Further, this method is only a partial solution to the purification problem because the effectiveness of removing impurities by extraction is a function of distribution between the solvents. Accordingly, an infinite number of extractions are required for a complete removal of the impurities. In addition, the use of solvents introduces an element of fire hazard to the overall process. Another known method for the removal of impurities is high pressure stream distillation. While this particular method appears to dispense with some of the fire hazards involved and the need for recovery of the solvent, it introduces additional problems. For example, it is necessary to install extremely costly equipment that is capable of withstanding the high pressures and temperatures that are required under the highly corrosive conditions found in such a steam distillation process. Further, this alternative method is again only a partial solution in as much as the effectiveness of steam distillation as a function of partial vapor pressures of the impurities so that some of the impurities are always left behind, especially those having higher boiling points. In addition, the various unsaponifiable materials obtained from such a process are contaminated by various side reactions during this process, as evidenced by the much darker colors and a tendency to produce a higher proportion of poly-functional fatty acid materials when such unsaponifiable materials are re-oxidized. Another severe drawback from this method of purifying the crude products is that a substantial amount of decarboxylation takes place which of course, materially lowers the yield as well as the average molecular weight of the desired product. Further, the drastic conditions presently employed, i.e. temperatures well in excess of 300° C. and pressures in the order of 200 atmospheres does not permanently re move all impurities so that a pure product is still not obtained.

SUMMARY OF THE INVENTION

In general, the invention provides a process of manufacturing straight-chained monobasic fatty acid (low molecular weight) esters i.e., fatty acid ester of low molecular weight alcohols from essentially linear hydrocarbons of an average molecular weight corresponding to one having 2 to 6 more carbon atoms than the fatty acid precursors of the desired range of fatty acid esters and consists of substantially uniformly dispersing an organic peroxide catalyst with the hydrocarbons so as to obtain a mixture thereof and heating the mixture to a temperature of not more than 160° C. and simultaneously contacting the mixture with an oxygen containing gas to effect an oxidation of the hydrocarbon so as not to exceed about 40% of free fatty acids by weight content of the reaction mixture. Thereafter, an alkali solution is added and intermixed with the reaction mixture to effect a saponification thereof. The saponified mixture is collected and a phase separation effected wherein an organic phase is removed and recycled for additional oxidation, while the aqueous phase (i.e. the lower phase) is purified to obtain the desired range of fatty acid (low molecular weight) esters. In a continuous embodiment, when the oxidation of the hydrocarbons attains an oxidation level not exceeding about 3% of free fatty acids, a portion is continuously withdrawn and purified. In a batch embodiment, when the oxidation of the hydrocarbons attains an oxidation level not exceeding about 40%, the oxidation is terminated and the batch is purified. The purification process includes esterification of the recovered crude product with a polyol, controlled removal of impurities from the resultant material and then transesterification with a selected low molecular weight aliphatic alcohol so that the polyol is recovered for reuse and the desired range of fatty acid esters is obtained in a relatively pure state. Alternatively, the crude soap solutions are hydrogenated under temperature-pressure conditions removing a number of impurities and a $C_1$ to $C_6$ aliphatic alcohol is added to the resultant relatively concentrated soap solution and then a stoichiometric amount of sulfuric acid is reacted with the resultant solution to form a sodium sulfate precipitate which is removed from solution. Then a further amount of sulfuric acid is added to the remaining solution to effect a phase separation thereof and separating the phases by decanting the top layer thereof which includes the desired range of the pure fatty acid esters of the $C_1$ to $C_6$ alcohol. Alternatively, the relatively concentrated soap solution is mixed with a solution of sulfuric acid which may include various polar solvent to effect phase separation thereof and mixing the product layer with at least an equivalent amount of a $C_1$ to $C_6$ aliphatic alcohol and thereafter reacting the solution with a stoichiometric amount of sulfuric acid to precipitate sodium sulfate and remove the same from solution. Thereafter, an additional amount of sulfuric acid is added for an additional phase separation and the top layer is decanted from such system and includes essentially pure fatty acid esters of said $C_1$ to $C_6$ alcohol.

Accordingly, one of the objects of the present invention is to provide a method of manufacturing synthetic fatty acid esters from straight-chain hydrocarobns, which method provides a substantial reduction of over-oxidation and molecular degradation.

Another object of the present invention is to provide a method of removing impurities from crude synthetic fatty acids obtained in the oxidation of paraffin materials and converting such crude synthetic fatty acids to desired (low molecular weight) esters whereby relatively economical equipment is employed and the chemical tools used in the removal of the impurities are easily recoverable and the method is relatively free of fire hazards.

Yet a further object of the invention provides a method of purifying crude fatty acid oxidation products obtained from the oxidation of paraffin materials whereby substantially pure fatty acid (low molecular weight) esters are obtained.

A further object of the invention is to provide a purification method for crude synthetic fatty acids wherein substantially mild conditions are utilized, with substantially inexpensive and easily maintained equipment and wherein the recovered unsaponified compounds are ready for re-processing without danger of excessive accumulation of impurities.

Still a further object of the invention is to provide a method of recovering relatively pure fatty acid (low molecular weight) esters whereby the use of an alkali mineral acid is entirely avoided and which esters are relatively convertible into fatty acids.

Other objects, advantages and features of the invention will become more apparent from the teachings of the principle of the present invention and in connection with the disclosure of the preferred embodiments thereof in the specification and claims.

DESCRIPTION OF THE PREFERRED EMBODIMENTS

During the course of the instant description, reference will be made to an "oxidation" reaction, and it is to be understood that the scope of this term is intended to generically imply oxidation reactions utilizing oxygen-containing gas to introduce at least one end preferably a plurality of oxygen atoms to an organic hydrocarbon material, such as a paraffin. Accordingly, reference to an "oxidation" reaction in the instant disclosure will be understood to apply to any and all reactions which result in the substitution of oxygen radicals into a molecule of the initial starting materials.

The starting materials or charging stock preferably consists of saturated aliphatic straight-chain hydrocarbons containing at least about six carbon atoms and up to thirty or forty carbon atoms. Preferably, the starting materials are paraffin hydrocarbons containing fourteen to twenty carbon atoms. The preferred oxygen-containing gas is air, however, other oxygen-containing gases can also be utilized. In accordance with the principles of the invention, an oxidizable hydrocarbon starting material is pumped into a suitable reactor chamber wherein it is intimately intermixed with the catalyst. The catalyst may be mixed with the starting materials during pumping or within the chamber or elsewhere as desired. Preferably, an organic peroxide catalyst is utilized since since catalyst can be intermixed with the reaction system and allow to remain therein without the necessity of filtering it or otherwise mechanically removing it from the mixture. Preferably, the organic peroxide utilized in the practice of the instant invention is selected whereby its half-life at the temperature of the reaction is approximately equal to the induction period of the oxidation reaction. Thus, tertiary-butyl hydroperoxide is somewhat slower acting, while certain other alkylol peroxides, such as lauroyl peroxide are relatively fast. Preferably, organic peroxides having a half-life of about 5 to 100 minutes at temperatures in the range of 120° C. to 180° C. are preferred. Such peroxides include benzoyl peroxide, di-tertiary-butyl peroxide, mixture thereof and other peroxides having similar properties. The half-life of a catalyst may be defined as the period in which the activity of the catalytic substance decreases to approximately one half of its initial value. Generally, the ratio of the catalyst material to the oxidizable hydrocarbon starting materials, i.e. the paraffin materials, is in the range of about 1:500 to 1:20,000 and preferably in the range of 1:1,000 to 1:2,000.

In accordance with the present invention, raw materials and the catalyst are placed in a reactor of convenient size and heated to a temperature of not more than about 160° C., and preferably in the range of about 120° C. to 160° C., whereupon oxygen-containing gas, such as air, is pumped through the raw materials at a preset rate. After an initial induction period ranging from several minutes to about two hours, depending primarily upon the catalyst and the hydrocarbon utilized, the reaction between the oxygen and the paraffin materials initiates and maintains itself. If so desired, a manganese soap soluble in paraffin materials under reaction conditions may be utilized to further reduce the induction time of the reaction. However, the use of this soap might require a filtration step and is thus optional. After the reaction is self-sustaining, the reaction mixture is withdrawn from the reactor at a preset rate as determined by the level of fatty acids therein and directed through a heat exchanger to a suitable saponification chamber wherein it is treated under efficient agitation with an aqueous alkaline solution. The intimate mixture of the oxidation reaction mixture and the alkaline solution is then transferred at a constant rate into a separator wherein stratification or phase separation occurs. The bottom layer consists of a soap solution while the top layer consists of unreacted or partially reacted raw materials which can then be transferred into a second separator or a liquid-liquid centrifuge to remove the last traces of the soap solution. The remainder of the partially reacted or unreacted oxidation materials is then recycled back to the reaction chamber and again passed through the oxidation reaction cycle just described. A certain amount of fresh raw materials is continuously fed into the reactor along with the recovered partially reacted materials so that the fresh material compensates for the removed material from the system in the soap solution. The bottom layer of the separator is withdrawn at a relatively constant rate and the soap thus obtained is transformed and purified into the desired range of fatty acid (low molecular weight) esters. In the continuous process embodiment, the rate of withdrawal of the reaction mixture from the reactor is so regulated that no more than about 3% of free fatty acids by weight of the total reactants within the reaction chamber have accumulated. This control of withdrawal rate inhibits over-oxidation and thus inhibits formation of multi-functional chemical compound which make purification difficult. In a typical $C_{14}-C_{18}$ paraffin oxidation reaction, the fatty acid level is maintained at an average of about 0.1 milliequivalent per gram of reaction product and never exceeds about 0.2 milliequivalent per gram. However, it will be appreciated that, when the desired fatty acid esters are of a lower molecular weight, i.e. $C_5-C_9$, then in order to maintain a 3% fatty acid level in the withdrawn reaction mixture, the milliequivalent per gram must be increased accordingly.

In accordance with the present invention, the acidic portion of the crude oxidation reaction product (whether obtained by the above described continuous reaction or by a batch reaction) may be purified in a number of alternative methods to obtain the desired range of fatty acid esters.

A method of purifying crude oxidation solutions as obtained from the separator, i.e. crude soap solutions, includes reacting the material with an equivalent amount of a mineral acid to separate the crude fatty acids and then reacting these crude acids with a relatively high boiling polyol so as to form a product having a much higher boiling point range than impurities remaining within the resultant mixture and thereafter removing such impurities by high temperature vacuum distillation. Thereafter, a relatively low molecular weight aliphatic alcohol is added to the distillation residue along with an interesterification catalyst, whereby the polyol is released and the fatty acids combined with the alcohol. The polyol is separated and is ready for recycling to the process just described and the recovered fatty acid esters of the low molecular weight alcohol are relatively pure and ready for use as desired, or they may be converted into the corresponding range of fatty acids. The method described above can also be used to purify the fatty acid portion of a batch oxidation reaction wherein said portion represents 10 to 40% of the total oxidate, by reacting the later directly with a polyol, and then proceeding as explained above, without prior saponification.

Another method of purifying the relatively crude fatty acid obtained by acidification of the original soap solution includes selective extraction of impurities therefrom with a solution of sulfuric acid in a polar solvent which is reactive with fatty acid carboxylic groups, i.e. $C_1-C_6$ alcohols. The extraction process allows impurities to remain within one phase of the two-phase system so formed, and substantially pure fatty acid esters of the $C_1-C_6$ alcohol are obtained in the other phase. By repeating such extraction steps a number of times, a high purity product can be obtained.

Another method of purifying the crude soap solution obtained from the separator includes mixing the soap solutions with a predetermined amount of a hydrogenation catalyst, purging the air from around such a mixture and introducing pressurized hydrogen gas (i.e. at 350 to 650 p.s.i.) and heat to obtain a temperature in the range of about 190° to 300° C. for a period of time, and maintaining such conditions while the pressure was within the hydrogenation vessel attains a range of about 500 to 2,000 p.s.i. After a brief digestion period, i.e. 10 to 60 minutes, the pressure is slowly released and the volatiles are allowed to escape. This distillation is continued until a relatively concentrated solution, i.e. at least 50% strength soap solution is attained. The hydrogenation catalyst is then removed, as by filtration, and the filtrate is then further processed by dissolving it in an excess amount of a relatively low molecular weight aliphatic alcohol, i.e. a $C_1$ to $C_6$ aliphatic alcohol, and reacting the resultant solution with a stoichiometric amount of sulfuric acid to form a sodium sulfate precipitate and removing the precipitate from solution while maintaining the temperature of the solution at about 10° C. to 50° C. Thereafter, an additional amount of sulfuric acid is added to the resultant solution to effect a phase separation therein and the top layer is decanted. The top layer includes the desired range of relatively pure fatty acid esters of the low molecular weight alcohol.

If desired, the acidic portion of the crude product may be purified in a number of alternative methods so as to form relatively pure fatty acids. These methods include combined saponification and hydrogenation processes as well as extraction processes reducing the level of contaminants in the recovered fatty acids. Additional concepts of this invention are disclosed and claimed in my copending U.S. Ser. No. 89,490, filed Nov. 13, 1970, now Pat. No. 3,708,513.

Yet another method of purifying crude $C_1-C_6$ esters obtained from a source thereof, such as initially available from one of the preceding embodiments yielding crude $C_1-C_6$ esters, comprises mixing the crude $C_1-C_6$ esters with a suitable solvent for any impurities therein and effecting a phase separation. A preferred solvent of this nature is relatively strong (60% to 94%) sulfuric acid. A relatively small amount of sulfuric acid is mixed with a portion of crude $C_1-C_6$ esters so as to form a two-layer system, which is then separated into its individual layers. The lower layer contains a majority of any impurities and the upper layer contains a majority of the $C_1-C_6$ esters and an amount of impurities substantially less than that originally present. This procedure may be repeated any number of times to obtain a desired degree of purity in the fatty esters.

As indicated previously, the preferred raw materials are straight-chain normal paraffin compounds, particularly those having from 10 to 24 carbon atoms. Expressed in another way, particularly since the paraffin materials are generally not obtainable in any one particular pure state but generally consist of a mixture of various molecular weight compounds, the starting paraffin materials should have a molecular distribution such that the molecular average value substantially corresponds to the molecular weight of the fatty acid precursors of the desired range of fatty acid (low molecular weight) esters plus 2 to 6 additional carbon atoms, i.e., the oxidation process of the instant invention generally removes 2 to 6 carbon atoms in forming the fatty acid precursors which are then esterified with a desired low molecular weight alcohol to yield the desired fatty acid low molecular weight esters.

When the paraffinic materials are intimately dispersed with air at elevated temperature, there is an induction period before the reaction actually begins, which varies with the particular conditions employed. The preferred catalysts of the invention reduce normal induction period of 5 to 15 hours to an induction period of less than 2 hours, depending upon the particular catalyst employed. Once the induction period has occurred, the oxidation reaction becomes self-sustaining and the crude reaction mixture products can be steadily and continuously removed from the reaction chamber at a preset rate of withdrawal, as described earlier. The steady and continuous removal of reaction mixture, which includes carboxylic compounds formed during the oxidation reaction, from the reaction zone or chamber inhibits re-oxidation of such compound since this would result in di- and other poly-functional compounds which are undesirable in that their presence renders purification extremely difficult. Further, such steady and continuous removal of the various carboxylic compounds formed, produces an additional beneficial effect in as much as the average molecular weight of the product obtained therefrom is significantly higher than the products obtained from a discontinuous or batch-type process. It is therefore apparent that the steady and continuous removal of the carboxylic compounds from the reaction zones significantly reduces molecular degradation. This is especially surprising since workers in the art have generally suggested that oxygen attack on a paraffin molecule is directed so that the end-product would be of a molecular size essentially half of the starting material.

A further beneficial effect which is immediately measurable is that the amount of esters formed in the oxidation products during any given time interval is substantially smaller than the amount of free acids formed during the same interval. This is quite surprising since in a batch-type process the amount of esters formed is usually found to be equal or greater than the amount of free acids formed. During a typical oxidation reaction of the invention, the ratio between esters and fatty acids within the reaction chamber is practically constant throughout the reaction period, although acids are being continuously removed from the reaction mixture while the esters remain therein.

A general characteristic of this type of oxidation is the formation of water of reaction. Generally, this water of reaction is collected in an appropriate scrubber system. The water layer generally contains an appreciable amount of volatiles and water soluble products, such as formic, acidic, and propionic acids, as well as apreciable amounts of peracids and hydrogen peroxide, which latter compounds are especially useful in epoxidation applications.

In order to achieve a process allowing the continuous removal of reaction products and recycling of raw materials (i.e. the unreacted and partially reacted starting materials) so as to allow such process to run for an infinite length of time, operational conditions have to be carefully adjusted so that the chemical composition of the materials in the reaction zone will be essentially the same at any given time during the process. This is achieved by proper adjustment of several variables, which include: temperature of the reaction; residence time; concentration and rate of alkaline solution and temperature of the alkali treatment.

The temperature of the reaction is carefully selected and controlled. The rate of reaction increases with temperature but so does re-oxidation and molecular degradation. However, if the temperature is too low the reaction will slow down and finally stop. The preferred temperature of reaction in the present invention is in the range of 120° C. to 160° C. whereby a balance between the speed of reaction and avoidance of reoxidation and degradation is achieved.

The residence time of the various chemical constituents in the reactions zone, is of course, somewhat dependent upon temperature of the reaction since the temperature regulates the reaction rate. Generally, the shorter the residence time, the less undesirable side reactions and the cleaner the product will be. However, too short a residence time does not yield sufficient product, even though such product might be exceptionally pure. It is therefore preferred to have a residence time in the range of about 20 to 100 minutes.

The concentration of the alkaline solution must be carefully selected in order to obtain the best results. If an alkaline solution is utilized which it too dilute, the soap solution tends to form emulsions which take a long time for stratification or phase separation and thereby upsets the timing of the cycle. On the other hand, if the alkaline solution utilized is too concentrated, then the soap solution will separate out faster but will have unfavorable solubility properties. Generally, it is preferred to utilize an alkali, such as sodium hydroxide, with a concentration range of about 2% to 15% by weight in water to obtain the best results. The rate of flow of the alkaline solution into the reaction mixture is adjusted in such a manner that there is preferably a slight excess of alkali over the total carboxylic content in the oxidation product at all times. In other words, the pH of the overall mixture is maintained substantially in the range of 8.0 to 12. If this pH is not maintained, extraction of the fatty acids becomes erratic, apparently due to the tendency of soap to form complexes with free fatty acid at a more acidic pH. As will be appreciated, any alkali may be utilized, although sodium hydroxide is preferred from a solubility and economic consideration.

The temperature of the alkali- oxidation product mixture is also carefully controlled. If this temperature is allowed to become excessively high, excess material will be extracted during each cycle and will contaminate the product. This will also tend to slow down the reaction and eventually stop it, since essential reaction intermediates, chiefly peroxides are removed or destroyed and cannot be regenerated fast enough to maintain the required rate of reaction. On the other hand, if the saponification temperatures are allowed to become too low, there is a tendency to form emulsions which separate too slowly to allow a continuous operation. Preferably, temperature is regulated so as to be in the range of about 30° C. to 60° C. and thereby provide effective and selective removal of the desired range of fatty acid precursors as well as a reasonably fast phase separation without a significant reduction in peroxide content of the reaction intermediates.

The rate of oxygen-containing gas pumped through the reactor influences the reaction to a limited extent over a wide range of rates. Essentially, the rate of oxygen containing gas, such as air, must be high enough to insure an excess of oxygen over and above the amount of oxygen required to form the expected amount of oxidation products per unit time. Generally, a sufficient excess is obtained by the use of a flow rate of air corresponding to about 250 to 1,000 ml. of air per kg. of hydrocarbon per minute, or about 4 to 16 times the theoretical oxygen requirement of the paraffin material to oxidize it to the desired fatty acids. Accordingly, the ratio of oxygen-containing gas to the paraffin materials is generally in the range of about 2:1 to 20:1. By keeping the flow of air on the lower side of the above range, excessive losses of volatile reactants are avoided and overall yields are substantially increased without affecting the chemistry of the reaction to any appreciable extent. Moreover, by keeping the air flow at a minimum within the aforesaid range, the rate of ester formation is substantially depressed both in a continuous-type reaction and also in a batch-type reaction. One explanation for this occurrence is that at higher rates of air flow, water of esterification is more quickly removed thereby allowing esterification to proceed at a faster rate and under the present conditions, where a minimum air flow is utilized, the water of esterification tends to accumulate and thereby retard esterification. Preferably, the air or other oxygen-containing gas is intimately dispersed through the reaction mixture by means of any convenient mechanical means, such as increased agitation of the overall mixture and/or utilization of a fine spray contacting the oxygen containing gas with the hydrocarbon materials. Generally, a sparge system wherein the air enters into a reactor through fast moving agitator blades having openings therein yields satisfactory results. Further, as the reaction proceeds and the oxidation products are formed, the degree of dispersion of air also increases thus making it unnecessary to use any surfactant-based surface tension depressors or other dispersion agents to effect the intimate dispersion between oxygen and the hydrocarbons.

The reaction is essentially exothermic and the reaction zone must be provided with an efficient heat exchanger in order to maintain a relatively constant reaction temperature. The heat exchanger is of such size and capacity as to be capable of maintaining the conditions in accordance with the volume of the reaction mixture.

The phase separation of the saponified oxidation products do not allow for ideal efficiency, and trace amounts of soap, water and free alkali are occasionally entrained by the recycle materials into the reaction zone. Generally, such small amounts of entrained contaminants do not influence the reaction to any appreciable extent except for the formation of minor solid particles which may tend to collect in spots throughout the reaction apparatus and threaten to clog the flow of the reaction mixture. However, convenient means, such as traps or the like may be placed in the conduits leading from the separator system to the reaction chamber to remove such solid particles.

A preferred means of utilizing a continuous process operation with a minimum of supervision includes the use of automatic leveling devices to control the flow of fluids automatically as a function of the present levels and interfaces whereby once the equilibrium conditions have been attained, such devices continue to maintain the equilibrium conditions. By way of illustrating the preferred oxidation process of the present invention, examples 1 and 2 are set forth hereinafter so that the principles of the invention may be better understood.

As indicated earlier, the crude oxidation products obtained from the oxidation reaction of paraffin materials described hereinabove may be purified in a number of improved and novel methods. One particular method of purifying such crude synthetic fatty acid products obtained by the oxidation of hydrocarbons involves the reaction of the products with a relatively high boiling material, such as a polyol in a manner so as to produce a mixture containing a higher boiling point polyester material and lower boiling impurities. The impurities are then removed by high temperature vacuum distillation and thereafter transesterification with a desired low molecular weight aliphatic alcohol, in the presence of an interesterification catalyst is performed, and the polyol is recovered in a relatively pure state ready for reuse without requirement for repurification or any additional manipulation. The high boiling reactant materials are preferably polyols, however, polyamines are also utilizable and the preferred polyols are selected from the group consisting essentially of pentaerythritol, glycerol, glycols and other similarly characterized polyols. In accordance with the principles of the invention, the relatively crude soap solutions which obtained by saponification of the oxidation products of the paraffins are subjected to flash distillation conditions so as to remove the desired fatty acid precursors from higher boiling polyfunctional impurity materials which tend to interfere with the purification operation. During such flash-distillation procedure, a certain amount of resinification occurs, so that the residue appears to be quite large. A great majority of the resinification is apparently due to esterification, so that by submitting the residue to an efficient saponification process, about half of the material can be recovered as relatively clean fatty acid precursor material.

The distillation is carried out in such a manner that most monofunctional materials will be removed with the distillate. For example, where the crude fatty acids consist primarily of $C_4$-$C_{16}$ acid products, the material is distilled until a vapor temperature of about 190° C. is reached and a reduced pressure or vacuum is used generally in the range of about 2 to 10 mm. Hg. The selected final temperature depends, of course, on the molecular size and distribution of the product being purified. Generally, it will be found that the distillation reaches an end point which is close to the point where little, if any, monofunctional materials remain in the residue.

This initial distillation step may be omitted and the crude product submitted directly to the procedure outlined hereinafter yielding a satisfactory product. However, it will be found that if this procedure is utilized, the recovery of the polyol is greatly reduced. As indicated earlier, the crude oxidation obtained from the oxidation reaction of paraffin materials described herein may be purified in a number of improved and novel methods.

One particular method of purifying such crude synthetic fatty acid precursors to obtain fatty acid (low molecular weight) esters comprises collecting the distillate from the flash distillation procedure, or if desired, omitting the flash distillation and merely utilizing the crude fatty acid products and reacting them with a high boiling reactive selected from the group consisting essentially of relatively high boiling polyols and preferably is pentaerythritol under conditions conductive for complete esterification of fatty acid precursors within such starting materials. Generally, a slight excess of the high reactive material, i.e., the polyol is preferred to insure complete reaction of all of the fatty acids in the distillate or starting materials. The esterification reaction is preferably carried out under inert blanket, such as nitrogen, to avoid side reactions which tend to occur in the presence of air. An esterification catalyst may be utilized, if desired, however, this is optional. The reaction mixture is heated and continuously agitated to insure intimate contact between the various components thereof. As the reaction progresses, water of esterification is formed and constantly removed. Preferably, an azeotropic agent, such as xylene, is added to the reaction mixture to remove the water of esterification. The temperature is maintained substantially below about 300° C. for a period of time until no further water of esterification is being collected. The preferred end point of the esterification reaction is ascertained by the free acid content in the reaction mixture. Preferably, free acid content in the mixture should generally be in the range of about 0.005 to 0.5 milliequivalents per gram of reaction mixture. It will be appreciated, of course, that the esterification reaction could proceed until free fatty acid content is brought down to substantially zero, however, practical considerations dictate otherwise.

When the esterification is substantially complete, the azeotropic agent is stripped off, as by distillation, and the reaction mixture is allowed to cool to about 50° C. to 100° C. under an inert atmosphere and a relatively high vacuum, generally in the range of 2 to 10 mm. Hg is applied and impurity, i.e. non-acids, are distilled off for a period of time until the vapor temperature reaches a point well above the temperature selected for the final fraction of the ultimate product under the vacuum conditions. For example, if the final product is to be fractionated at 145° C., then the distillate temperature is maintained at about 150° C. to 190° C. This insures that practically no impurities will co-distill with the fraction of pure products obtained subsequently.

The stripping process can, of course, be extended to a point where the distillation slows down due to a lack of mono-functional impurities, but this entails the risk of losing some of the polyol, because the lowest fraction of the polyesters have a tendency to overlap with the highest boiling impurity.

The distillate obtained in the last step (hereafter called non-acids) can be re-cycled as oxidation raw material in the oxidation process described hereinbefore. Such non-acids contain mainly partially reacted and/or unreacted paraffin and chemical intermediates.

The stripped polyesters are allowed to cool down to almost ambient temperature and then dissolve in a molar excess of at least five equivalents of a low boiling aliphatic alcohol, i.e. a $C_1$–$C_6$ aliphatic alcohol, such as methanol, and a small amount of an efficient interesterification catalyst, such as sodium methylate ($NaOCH_3$). The polyol, i.e. pentaerythritol, separates out and esters of the low boiling alcohol are formed with the range of fatty acid precursors present. Generally, a time period in the range of 15 to 60 minutes is sufficient to attain fairly complete separation. The excess amount of low boiling alcohol is then stripped off and the separated polyol recovered for recycling in a process described. The resulting fatty acid esters can be fractionated to obtain better separation thereof. Additionally, such fatty acid esters may be readily converted into the fatty acids if desired.

The fractions of fatty acid esters obtained by the practice of the invention are of high purity and are substantially in the range of 98–99% pure which generally compares with the order of magnitude of 94–96% purity obtained by high pressure steam treatment or 89–92% as obtained by present day solvent extractions.

The residue from the final fractionation can be combined with the residue obtained from the initial distillation and resaponified so that about half of the combined residues can be recovered as fatty acid precursors. Of course, such precursors, i.e. the fatty acids, can be utilized as such. It has been found that the acids recovered from such residue have a surprisingly high degree of purity, which may be explained by the fact that most of the distillated impurities have already been removed.

Another method of purifying crude synthetic fatty acid products obtained by the oxidation of hydrocarbons involves the combination of hydrogenation and saponification process as well as extraction processes.

In accordance with this method, a crude soap solution of about 10% to 40% and preferably 25% strength is fed into an appropriate pressure vessel capable of handling corrosive materials at elevated pressure and temperature conditions. A crude-soap solution of a given concentration or strength is mixed with a predetermined amount of a hydrogenation catalyst and air is purged from the pressure vessel. Hydrogen gas is introduced into the system under pressure in the range of about 350 to 650 p.s.i. while heat is simultaneously added so that the mixture attains a temperature in the range of about 190° C. to 300° C. and these conditions are maintained for a digestive period of time while the pressure within the system increases up to about 2,000 p.s.i. After a digestion period of about 10 to 60 minutes, the pressure is gradually released through an opening at the top of the vessel allowing steam and other volatiles to escape into a suitable condenser system. The steam entrains various gross impurities which can be condensed to form an oil layer that is easily recoverable from the condensate by decantation. The oil layer is of a light color and consists primarily of unreacted paraffins, alcohols, ketones and other less identifiable chemicals. It is significant that practically no esters can be found in this oil.

The steam distillation is continued until the crude soap solution reaches a relatively concentrated stage, i.e. at least 50% strength, as indicated by the amount of the condensate. The soap solution is then discharged, and the catalyst is removed, as by filtration. The filtrate is then further processed to obtain the desired range of relatively pure fatty acid low molecular weight esters, or, if desired the pure fatty acids.

The above described hydrogenation process can be carried out in such a way that the charging of the crude soap solution and the steam distillation therefrom proceeds in a substantially continuous manner. For instance, the crude soap solution coming from a continuous oxidation process is pumped into a pressure vessel where it is mixed with a catalyst and hydrogen and is then pressurized and heated to a higher temperature while steam and concentrated soap are expelled at a controlled rate. All these various flows are adjusted in such a manner that a preset residence time is achieved and a steady level of liquids is maintained throughout the system.

The relatively concentrated soap solutions can be treated a number of different ways to obtain the desired fatty acid low molecular weight esters. As indicated, the relatively concentrated soap solutions (i.e. ones having about 50% to about 85% strength) are cooled to a temperature below about 70° C. and the hydrogenation catalyst is removed. Thereafter, at least an equivalent and preferably 1 to 3 volume equivalents of a $C_1$ to $C_6$ aliphatic alcohol is added to this concentrated soap solution and well agitated to obtain a substantially uniform solution. Thereafter, a stoichiometric amount of sulfuric acid is added to this solution and allowed to react therewith so as to form a sodium sulfate salt which immediately precipitates. The precipitated sodium salt is removed from the solution, as by simple filtration, and washed with a suitable solvent, such as methanol, and recovered in a relatively pure state. The remaining solution is then provided with a relatively small amount of additional sulfuric acid (having a concentration in the range of about 60% to 94%) whereupon a clear cut phase separation occurs, the top layer containing substantially all of the desired range of pure fatty acid esters of the $C_1$ to $C_6$ alcohol and the bottom layer containing substantially all of the mineral acids and various other impurities. It has been found that by repeated extraction, with various mixtures of acid and alcohol the amounts of impurities remaining in the fatty acid methyl esters are drastically reduced. This appears to be primarily a function of the selective solubility displayed by the acid/alcohol solvent system, which shows a marked affinity for poly-functional chemicals, such as lactones.

The very rapid and high yield esterification process under a mild reaction condition is made possible by the efficient removal of water of reaction, partially by the sodium sulfate salt that is formed and partially by the sulfuric acid itself. It has been found that this principle is applicable to a wide variety of alcohols and fatty acids, limited only by solubility considerations. Thus, mixtures of sulfuric acid with any relatively low boiling aliphatic alcohol, although methanol is preferred, satisfactorily participates in the esterification reaction just described and removes impurities therefrom so that relatively pure fatty acid esters are obtainable. For instance, isopropanol, tertiary-butanol, ethanol, etc. are effective components in the acid-alcohol solvent mixture for the purposes as explained hereinbefore. Preferably methanol is utilized as it is more abundant and the fatty acid methyl esters find great utility. When it is desired to purify the methyl ester, (or other low molecular weight ester) obtained by the steps described above to a higher degree, additional mixing and separating from a mixture of sulfuric acid and methanol at a ratio of sulfuric acid to such alcohol being substantially in the range of 1:10 to 10:1 will greatly reduce the contaminants present.

It has also been found that certain polar solvents other than alcohols, which are substantially non-reactive with fatty acid carboxylic groups also perform satisfactorily as impurity removing materials, when mixed with sulfuric acid. Examples of such additional polar solvents include acetone, dioxane, methyl butyl ketone, etc. The ratio of sulfuric acid to polar solvents likewise range from about 1:10 to 10:1. As indicated, repeated extractions are utilized to further increase the purity of the product, particularly by the use of a counter current flow process.

The temperature of the extraction solution has been found to be significant in that if it is too high, scorching tends to occur and if it is too low partial solidification tends to take place and impair the process. Preferably, the temperature of the extraction solution is maintained in the range of about 10° C. to 50° C.

The combined bottom layers obtained from the extraction process containing the mineral acid, methanol (or other solvents) and most of the impurities, is then stripped and the concentrate is diluted with water. This procedure releases the oil portion which can then be decanted and then recycled into the next batch of hydrocarbons being oxidized.

The fatty acid methyl esters obtained by the above-described methods are then submitted to fractionation, in order to obtain products having the desired range of molecular weight. These products are found to be water-white, with the exception of the highest fraction which has a slight pale hue. The color stability is relatively good. However, if such products are to be used as raw materials the manufacture of yet other products wherein absolute absence of coloring material is desired, additional treatments are generally necessary for the removal of traces of chromophores from such ultimate products. The fractionated products may be treated with sulfuric acid of about 60–70% concentration and preferably less than 94% concentration, under mild conditions, followed by a treatment with a mild alkali solution, such as a bicarbonate, or diluted sodium hydroxide, to increase the stability of the color. The sequence of acid-alkali or alkali-acid treatment is important and depends on the medium wherein a further reaction of the product will occur. Thus, for instance, when a reaction is intended which requires an alkali catalyst, it is preferable to follow the acid-alkali sequence, while an acid catalyst would impose a reverse order.

When it is desired to run the oxidation process hereinbefore described in a discontinuous or batch process, the recovery of the fatty acid low molecular weight esters from the oxidate can be greatly enhanced by applying the principles of the present invention. For example, after the oxidation of a batch has reached the desired free acid content (i.e. about 10 to 40% by weight), the whole oxidate can be reacted with a calculated amount of a polyol, such as pentaerythritol, until practically complete esterification is achieved. All of the unoxidized and partially oxidized non-acids can then be removed by vacuum distillation and the obtained distillate recycled to the next oxidation batch. The remaining polyol esters can then be transformed into methyl esters by the hereinbefore described interesterification reaction. It has been found that the recovery of the polyol is not as efficient in the batch process, apparently due to the presence of polyfunctional compounds, but the additional loss is more than compensated for by the fact that this process requires neither alkaline or mineral acid and the number of steps involved is greatly reduced.

A number of examples will now be set forth to further illustrate but not limit the principles of the invention.

EXAMPLE I 6,335 grams of raw materials consisting essentially of a mixture of normal tetradecane, pentadecane, and hexadecane was charged into an appropriate reaction apparatus by placing 2,400 grams in a reactor thereof with the rest of the raw materials being divided between an extractor and two separators as well as a reservoir vessel. In order to eliminate any induction period, the initial charge of raw materials was pre-oxidized in a batch-type reaction to an acid content of 0.15 me./g. and the free acid removed the bi-extraction with an alkaline solution. One gram of di-tertiary butyl peroxide was placed in the reactor and the material heated to 140° C. Air was sparged through the reactor at a rate of about 8 liters per minute (corresponding to 3.31 kg. oil/min.) and the reaction set in almost at once, as evidenced by formation of water of reaction which was collected in a water trap. When about 4 ml. of water was collected, the raw materials were allowed to circulate in the system and the continuous cycle started at a rate adjusted to one hour residence time, which corresponds to a maximum fatty acid content of about 3% by weight of total reactants within the reactor. The adjustment was by means of adjustable Teflon stop cocks controlling all gravity flows and with conventional pumps. A NaOH solution was charged into the alkali supply vessel at a 2.5% strength and its rate of flow was adjusted to provide enough alkali to neutralize the free fatty acids in the reactants at the saponification chamber. This cycle was maintained around the clock for 84 hours and at the end of this time period the reaction was stopped. During the reaction time, fresh materials (but no additional catalyst, nor any preoxidized material) was continuously fed to the system at a rate which would compensate for the material removed from the system by the alkali solution and by periodic sampling for analysis. The total charge of raw materials during the cycle was 14,820 grams. At the end of the run, 8,044 grams of oil were accounted for thus:

| | Grams |
|---|---|
| In the apparatus | 6,390 |
| Removed for sampling | 962 |
| Recovered from the scrubber system | 692 |

Accordingly, the consumed materials amounted to 6,776 grams. The soap solution collected in the soap reservoir was acidified with $H_2SO_4$ to a pH below 3.5, and the obtained layer of crude reaction products, i.e. unpurified fatty acids, weighed 5694 grams for about a 84 yield. As will be appreciated, the acidification was performed at this time merely to ascertain the results of the oxidation process and under natural operating conditions it is more practical to continue directly with one of the purification steps discussed earlier.

Of this crude oxidation product, 5,100 grams was resaponified and the gross impurities removed by repeated extraction with petroleum ether, whereupon the soap solution was acidified and 3,380 grams of fatty acid and 1,465 grams of oil were recovered. This oil was suitable for use as a recycle material into the oxidation process. The fatty acids thus obtained had an average molecular weight of 186, generally corresponding to undecanoic acid and had a molecular distribution as follows:

| Faty acids: | Percent |
|---|---|
| $C_6$–$C_7$ | 6.5 |
| $C_8$–$C_{10}$ | 26.8 |
| $C_{11}$–$C_{14}$ | 54.9 |
| $C_{15}$–$C_{16}$ | 11.8 | as determined by gas chromatography.

The water of reaction collected in the trap weight 2,287 grams and contained about 4% $H_2O_2$ and about 9% water soluble acids and peracids. The obtained fatty acids were readily converted into low molecular weight esters, i.e. methyl esters by intermixing them with methanol in the presence of sulfuric acid and removing impurities with an additional amount of sulfuric acid to effect a phase separation therein. The phase system was then separated into its constituent layers merely by decanting the top layer therefrom, which was found to contain the desired range of relatively pure fatty acid methyl esters.

EXAMPLE II 9,100 grams of a starting material consisting essentially of a mixture of normal tetradecane (29.4%), pentadecane (42.9%), and hexadecane (23.6%) was charged into the apparatus system described in conjunction with Example I by placing 2,400 grams into the reactor and dividing the rest of the material between the two separators, the saponification vessel and the reservoir vessel. In order to avoid an induction period, the starting material was pre-oxidized to an acid content of 0.15 me./g., and the free acid removed by extraction with an alkaline solution. One gram of di-tertiary butyl peroxide was placed in the reactor and the material heated to 140° C. Air was sparged through the reactor at a rate of 2.5 liters per minute, or 1 liter air/kg oil/minute, and the reaction set in almost at once, as evidenced by water of reaction starting to collect in a trap. When about 4 ml. of water was collected, the continuous cycle was started at a rate of one hour residence time in the reactor (i.e. corresponding to approximately a 3% fatty acid formation). A NaOH solution was charged into the alkali supply vessel at a 9.3% strength and its rate of flow into the saponification vessel was adjusted to provide an amount of alkali corresponding to about 10% excess over the amount calculated to neutralize the total carboxylic content in the reactant at the saponification chamber. In order to help break up the emulsion, the temperature in the saponification vessel was maintained at about 40° to 45° C. No other electrolyte was used in the NaOH solution, and the rate of separation of emulsion was satisfactory. This cycle was maintained around the clock for 108 hours, at the end of which time period it was stopped. The general equilibrium conditions of the reaction were noted and the ratio of free fatty acid to esters remained essentially constant. During this time fresh material was continuously fed to the system at a rate adjusted to compensate for the materials removed from the system during the reaction period. In order to simulate ultimate batch-type conditions, the fresh material was identical with the material used for the initial charge. No additional catalyst was used. These fresh materials brought the total charge of raw material to 22,640 grams.

At the end of the run, 11,015 grams of oil was accounted for thus:

|  | Grams |
|---|---|
| In the apparatus | 9,910 |
| Removed for samples | 800 |
| Recovered in the scrubber system | 923 |
| Lost by spillage | 102 |

Accordingly, the consumed materials amounted to 11,625 grams. The soap solution was collected in the soap reservoir vessel and acidified with $H_2SO_4$ to a pH 3 (again to merely ascertain the results of the oxidation process) and a crude oxidation reaction mixture so obtained weighed 11,480 grams for a yield of 98.8%.

500 grams of this crude reaction mixture was dissolved in a solution of 100 grams NaOH in 1500 cc. of $H_2O$ to recreate pre-acidification conditions. The so-obtained soap solution was then charged into an autoclave of 4 liter capacity and heated to about 250° C. under pressure. Gross impurities were removed by steam distillation and the concentrated soap solution was cooled and acidified. In this manner 75 grams of recycled oil was collected and 351 grams of synthetic fatty acids were recovered. The recycle oil had a carbonyl content of about 0.68 me./g. and an OH content of 2.54 me./g. The synthetic fatty acids recovered were analyzed to have a number average molecular weight of 172, generally corresponding to decanoic acid, and had a molecular distribution as follows:

| Fatty acids: | Percent |
|---|---|
| $C_4$–$C_7$ | 13.2 |
| $C_8$–$C_{10}$ | 36.4 |
| $C_{11}$–$C_{14}$ | 41.0 |
| $C_{15}$–$C_{16}$ | 9.4 | as determined by gas chromatography. These fatty acids were then reacted with a $C_1$ to $C_6$ aliphatic alcohol and purified to obtain the desired range of fatty acid low molecular weight esters.

EXAMPLE III

An oxidation reaction was carried out in accordance with the procedure described in Examples I and II. After the oxidate was saponified and the soap solution acidified, the crude fatty acids were found to have a mean molecular weight of 175, a free acid content of 73.8% and an ester content of 0.42 me./g.

1937 g. of this crude fatty acid reaction product was distilled under 2.5 mm. Hg vacuum until the vapor temperature reached 188° C. 1525 g. distillate was collected and analyzed to contain 0.67 me./g. ester. The residue amounted to 350 g. and contained 2.50 me./g. ester, indicating that some esterification took place during distillation. The distillate obtained was reacted with 271 g. pentaerythritol under a nitrogen blanket, in the presence of 50 cc. of xylene acting as an azeotropic agent. The temperature of the reactants was raised to 215° C. over a period of about 5 hours, while the acid content dropped to 0.08 me./g. A total of 125 cc. water of esterification was collected, which corresponded approximately to the theoretical amount calculated. After removal of xylene, the reactants were cooled to 160° C., and then a vacuum of 2.5 mm. Hg was applied and non-acids (i.e. unreacted and partially reacted oxidation products) were stripped-off for a period of time until a vapor temperature of 170° C. was reached. At this stage 431 g. of non-acids were collected, leaving a total of 1189 g. of the fatty acid-polyol ester. After cooling, the polyol ester portion was reacted with 1,200 ml. of methanol in the presence of 4 g. $NaOCH_3$ at reflux temperatures for about 30 minutes, whereupon the excess methanol was stripped-off and the precipitated pentaerythritol was filtered off. Thus, 1080 g. methyl ester with 246 g. pentaerythritol were obtained. Recovery of the pentaerythritol amounted to about 91% and was found to be of excellent quality ready for recycle. The methyl ester had a mean molecular weight of 179.4 and an ester content of 95.2%, as determined by gas chromatography and 94.8% as determined by Ester Value. Upon distilling the methyl ester under 2.5 mm. Hg vacuum, 90% went over a maximum vapor temperature of 145° C. The obtained distillate was colorless and contained only 1.1% impurities, as determined by gas chromatography.

The residue left upon distillation of the crude acids as described at the beginning of this example was then submitted to a high pressure-high temperature saponification and steam distillation at about 300° C. and 2,000 p.s.i. In this manner 238 g. crude acids and 68 g. recycle oil was obtained from 350 g. residue. Upon high-vacuum distillation of the crude acids, 139 g. of a colorless material was collected, which upon esterification with methanol, was analyzed by gas chromatography to contain only 3.1% impurities. The material balance of the whole operation was consequently as follows:

Total products obtained: 1213 g. or 63% yield
Recycle material: 499 g. or 26% yield

EXAMPLE IV

A reaction was carried out as described in Example III, except that the crude fatty acids were reacted directly with pentaerythritol, without previous distillation. The recovered pentaerythritol amounted to 79% of polyol charged, the loss being attributed to interference by polyfunctional materials in the crude products.

EXAMPLE V

A reaction was carried out in accordance with the procedure outlined in Example III, except that glycerol was substituted for pentaerythritol. Upon interesterification with an excess amount of methanol, the glycerol layer dropped out almost quantitatively as a distinct layer, and the obtained methyl ester had an impurity content of 3.8%, as determined by gas chromatography. The recovered glycerol was found to necessitate some purification before being in condition for reuse, however, under certain conditions this recovered glycerol layer could be utilized without such purification.

EXAMPLE VI 500 g. of a distillation residue obtained by the distillation of the crude synthetic fatty products as described in Example III was mixed with a solution of 90 g. NaOH in 1500 cc. $H_2O$. The obtained soap solution was then charged into an autoclave constructed of 316 stainless steel of one gallon capacity and equipped with agitator, internal cooling and an automatic temperature control assembly. A narrow tube connected to the top of the pressure vessel with a long condenser. The system was closed and air purged therefrom and pressurized hydrogen added. Heat was applied until a temperature of about 330° C. was attained while pressure rose to 1980 p.s.i. After a one half hour digestion period, steam was allowed to escape through the condenser until a total of 1000 ml. water was collected, together with 88 g. of steam-entrained oil. The concentrated soap solution (i.e. about 50% of strength) was cooled, discharged and acidified with $H_2SO_4$ to a pH 3.5 and 397 g. crude fatty acids was obtained by decantation. Such crude fatty acids were esterified with methanol and the obtained methyl ester was distilled under 4 mm. vacuum until the vapor temperature reached 183° C. In this manner 232 g. of distillate and 139 g. of residue was obtained. The distillate had a mean molecular weight of 190.5 and contained 3.1% of impurities as determined by gas chromatography.

EXAMPLE VII 675 g. of the soap solution obtained in the reaction described in Example VI was dispersed in 1.5 liters of methanol and acidified with 160 g. of concentrated $H_2SO_4$ by slow addition under refluxed conditions. A copius precipitate of $Na_2SO_4$ fell out and was removed by filtration. Upon drying, the precipitate weighed 200 g. Methanol was then stripped-off until a total weight of 1300 g. remained within the reaction apparatus. This was cooled to room temperature and an additional amount of 166 g. $H_2SO_4$ was introduced, which caused a two-layer system to form. The layers were separated, by decantation, and the upper layer weighed 419 g. and was analyzed to consist essentially of pure methyl esters while the bottom layer, upon dilution with water, yielded 100 g. of oil consisting of a methyl ester with a high content of impurities (23.2%). The methyl ester recovered from the upper layer was analyzed to have a mean molecular weight of 186 and to contain 8.1% impurities, as determined by gas chromatography.

EXAMPLE VIII 80 g. of a methyl ester prepared from the crude synthetic fatty acids obtained by the reaction described in Example I was analyzed by gas chromatography to contain 20.2% impurities and was well agitated, at room temperatures, with a solvent mixture of 160 g. methanol and 75 g. sulfuric acid solution (i.e. having a concentration less than 94%). After standing a few minutes, the system separated into two distinct layers, which were separated one from the other by decantation. The top layer weighed 54 g. and was analyzed to consist essentially of methyl esters having a mean molecular weight of 192 and containing 11.4% impurities. The bottom layer was diluted with 500 g. $H_2O$ and 24 g. of oil separated out which was analyzed as consisting essentially of a methyl ester having a lower mean molecular weight (181.4) and containing 31.4% impurities.

The efficiency coefficient, defined as the ratio between the amount of impurities removed and the amount of total material removed, was =0.38 for this example.

EXAMPLE IX

The procedure described in Example VIII was repeated, except that the solvent mixture was 153 g. of a 1:1 mixture of methanol and concentrated $H_2SO_4$. This time the top layer weight 66.5 g. and the methyl ester contained 10.6% impurities and the efficiency coefficient was 0.675.

The top layer was extracted a second time with the same amount of solvent mixture. The recovered methyl ester weighed 58.5 g. and contained 8.1% of impurities while the efficiency coefficient was 0.29.

EXAMPLE X 80 g. of a synthetic methyl ester containing 13.4% impurities as determined by gas chromatography was shaken vigorously with 100 g. of a 1:1 mixture of acetone and concentrated $H_2SO_4$. After allowing the system to stand a few minutes, the layers were separated and the top layer washed with water. The methyl ester obtained weighed 59.3 g. and contained 6.5% of impurities. The efficiency coefficient was 0.334.

EXAMPLE XI

A $C_{11}$–$C_{14}$ fraction of a synthetic methyl ester obtained by the process described in Example III was reacted with a calculated amount of diethanolamine in the presence of $NaOCH_3$ until the amidification reaction was practically complete. The resultant amide had a color factor of 5 on the Gardner scale. 60 g. of this amide was diluted with 500 ml. methanol, in order to lower the viscosity thereof, and the solution was placed in a stainless steel pressure vessel together with 12 g. of a 50% nickel on kieselgur catalyst. Air was purged from the vessel with hydrogen at a pressure of about 500 p.s.i. and heat was added until a temperature of about 80° C. was obtained. Thereafter, the vessel was closed and these conditions were maintained for about 4 hours. The material was then cooled, depressurized, discharged and the catalyst removed by filtration. After stripping the methanol, the resultant amide had a color factor of 2 on the Gardner scale.

EXAMPLE XII 1200 g. of a mixture of linear tetradecane, pentadecane, and hexadecane was placed in a 2-liter flask provided with a stirrer, a thermometer, a gas inlet and a scrubbing assembly. 2 g. of manganese laurate was added and the contents in the flask heated to a temperature of 140° C. while air was sparged through this mixture at a rate of 1 lit./min. Two drops of di-tertiary butyl peroxide was then introduced and the oxidation reaction started immediately. The above described conditions were maintained for about 16 hours, at which time the free acid content had reached the value corresponding to 38% by weight of the reactants. The air flow was then stopped, and the contents of the flask cooled to below 80° C. and the particulate catalyst removed by filtration. Thereafter 75 g. of pentaerythritol was introduced together with 50 g. of xylene and the resulant solution was heated gradually up to 220° C., with a continual withdrawal of water of esterification azeotropically under a blanket of nitrogen. When the free acid content had dropped to 0.08 me/g., vacuum was gradually applied while the temperature was allowed to drop to 180° C. The vacuum distillation was continued until the vapor temperature reached 210° C. under 3 mm. Hg vacuum. The reactants were then cooled to 60° C. and 500 ml. of dry methanol was introduced therein together with 5 g. of a 25% solution of $NaOCH_3$. Almost immediately a voluminous precipitate of pentaerythritol was formed. The reactants were further digested at 70° C. for a period of about 30 minutes and then cooled to room temperature. The precipitate (i.e. pentaerythritol) was then filtered off and after drying in an oven the precipitate weighed 54.5 g., for a recovery of about 78% polyol. The recovered polyol was pure enough for reuse without additional purification. The methanolic solution in the filtrate contained methyl esters which upon fractionation yielded a product of high purity.

It is therefore clear that the present invention provides methods of purification of carboxylic compounds obtained by a continuous oxidation process wherein the free fatty acid content is maintained below 3% in the reaction zone, as well as methods of obtaining pure esters of synthetic fatty acids obtained by a batch process wherein the amount of free fatty acids is allowed to rise as high as 40% in the reaction zone.

Throughout the instant disclosure and the claims thereof, the term "fatty acid (low molecular) ester" or "fatty acid ($C_1$–$C_6$) ester" is frequently used. The term as utilized herein will be understood to mean fatty acid esters of low molecular weight alcohols or fatty acid esters of $C_1$–$C_6$ alcohols.

Various other modifications and changes, other than those already discussed, can of course be effected without departing from the spirit and scope of the novel concepts of the instant invention.

I claim as my invention:

1. A process of obtaining straight-chain monobasic fatty acid esters of relatively low molecular weight aliphatic alcohols from $C_6$ through $C_{40}$ essentially linear hydrocarbons of an average molecular weight corresponding to hydrocarbons having 2 to 6 more carbon atoms than the fatty acid precursors of a desired range of fatty acid esters of said alcohols, consisting essentially of
   (A) substantially uniformly dispersing an organic peroxide catalyst having a half life of 5 to 100 minutes at a temperature range of 120° to 180° C. with said linear hydrocarbon to obtain a mixture thereof;
   (B) heating said mixture to a temperature of not more than about 160° C.;
   (C) substantially simultaneously contacting said mixture with an oxygen containing gas to effect an oxidation thereof not exceeding about 40% of free fatty acids by weight content of said mixture;
   (D) adding and intermixing an alkaline solution with at least a portion of said mixture to effect a phase separation of the resultant mixture;
   (E) removing an upper phase of said resultant mixture and recycling said upper phase to step (B);
   (F) acidifying the remaining lower phase of said resultant mixture with an equivalent amount of a mineral acid so as to obtain a phase separation whereby an upper phase thereof contains fatty acid precursors of the desired range of fatty acid esters;
   (G) adding a relatively high boiling polyol selected from the group consisting of pentaerythritol, glycerol and glycols to said upper phase of step (F) and substantially simultaneously heating the ensuing mixture to form a reaction mixture consisting of fatty acid polyol esters and impurities, said fatty acid polyols having a boiling range substantially higher than the boiling range of said impurities;
   (H) continuously removing water of esterification from said ensuing mixture and controlling the temperature thereof;
   (I) cooling said reaction mixture to substantially below the boiling range of said impurities;
   (J) applying vacuum and controlled heat to the cooled reaction mixture to remove said impurities therefrom;
   (K) adding at least five equivalents of said low molecular weight aliphatic alcohol in the presence of an interesterification catalyst to attain a mixture of said fatty acid polyols and said low molecular weight alcohol;
   (L) refluxing the attained mixture under ester-forming conditions for a period of time ranging from about 15 to 60 minutes so as to form a layer of fatty acid esters of said low molecular weight aliphatic alcohol and a layer of said high boiling polyol; and
   (M) separating said layers to recover said high boiling polyol and the desired range of fatty acid esters of said low molecular weight aliphatic alcohol.

2. A batch process of obtaining straight-chain monobasic fatty acid esters of relatively low molecular weight aliphatic alcohols from $C_6$ through $C_{40}$ essentially linear hydrocarbons of an average molecular weight corresponding to hydrocarbons having 2 to 6 more carbon atoms than the fatty acid precursors of a desired range of fatty acid esters of said alcohols, consisting essentially of
   (A) substantially uniformly dispersing an organic peroxide catalyst having a half life of 5 to 100 minutes at a temperature range of 120° to 180° C. with said linear hydrocarbon to obtain a mixture thereof;
   (B) heating said mixture to a temperature of not more than about 160° C.;
   (C) substantially simultaneously contacting said mixture with an oxygen containing gas to effect an oxidation thereof equal to about 10% to 40% of free fatty acids by weight content of said mixture;
   (D) adding and intermixing an alkaline solution with at least a portion of said mixture to effect a phase separation of the resultant mixture;
   (E) removing an upper phase of said resultant mixture and recycling said upper phase to step (B);
   (F) acidifying the remaining lower phase of said resultant mixture with an equivalent amount of a mineral acid so as to obtain a phase separation whereby an upper phase thereof contains fatty acid precursors of the desired range of fatty acid esters;
   (G) adding a relatively high boiling polyol selected from the group consisting of pentaerythritol, glycerol and glycols to said upper phase of step (F) and substantially simultaneously heating the ensuing mixture to form a reaction mixture consisting of fatty acid polyol esters and impurities, said fatty acid polyols having a boiling range substantially higher than the boiling range of said impurities;
   (H) continuously removing water of esterification from said ensuing mixture and controlling the temperature thereof;
   (I) cooling said reaction mixture to substantially below the boiling range of said impurities;
   (J) applying vacuum and controlled heat to the cooled reaction mixture to remove said impurities therefrom;
   (K) adding at least five equivalents of said low molecular weight aliphatic alcohol in the presence of an interesterification catalyst to attain a mixture of said fatty acid polyols and said low molecular weight alcohol;
   (L) refluxing the attained mixture under ester-forming conditions for a period of time ranging from about 15 to 60 minutes so as to form a layer of fatty acid esters of said low molecular weight aliphatic alcohol and a layer of said high boiling polyol; and
   (M) separating said layers to recover said high boiling polyol and the desired range of fatty acid esters of said low molecular weight aliphatic alcohol.

3. A continuous process of obtaining straight-chain monobasic fatty acid esters of relatively low molecular weight aliphatic alcohols from $C_6$ through $C_{40}$ essentially linear hydrocarbons of an average molecular weight corresponding to hydrocarbons having 2 to 6 more carbon atoms than the fatty acid precursors of a desired range of fatty acid esters of said alcohols, consisting essentially of
   (A) substantially uniformly dispersing an organic peroxide catalyst having a half life of 5 to 100 minutes at a temperature range of 120° to 180° C. with said linear hydrocarbon to obtain a mixture thereof;
   (B) heating said mixture to a temperature of not more than about 160° C.;
   (C) substantially simultaneously contacting said mixture with an oxygen containing gas to effect an oxidation thereof not exceeding about 3% of free fatty acids by weight content of said mixture;

(D) adding and intermixing an alkaline solution with at least a portion of said mixture to effect a phase separation of the resultant mixture;

(E) removing an upper phase of said resultant mixture and recycling said upper phase to step (B);

(F) acidifying the remaining lower phase of said resultant mixture with an equivalent amount of a mineral acid so as to obtain a phase separation whereby an upper phase thereof contains fatty acid precursors of the desired range of fatty acid esters;

(G) adding a relatively high boiling polyol selected from the group consisting of pentaerythritol, glycerol and glycols to said upper phase of step (F) and substantially simultaneously heating the ensuing mixture to form a reaction mixture consisting of fatty acid polyol esters and impurities, said fatty acid polyols having a boiling range substantially higher than the boiling range of said impurities;

(H) continuously removing water of esterification from said ensuing mixture and controlling the temperature thereof;

(I) cooling said reaction mixture to substantially below the boiling range of said impurities;

(J) applying vacuum and controlled heat to the cooled reaction mixture to remove said impurities therefrom;

(K) adding at least five equivalents of said low molecular weight aliphatic alcohol in the presence of an interesterification catalyst to attain a mixture of said fatty acid polyols and said low molecular weight alcohol;

(L) refluxing the attained mixture under ester-forming conditions for a period of time ranging from about 15 to 60 minutes so as to form a layer of fatty acid esters of said low molecular weight aliphatic alcohol and a layer of said high boiling polyol; and (M) separating said layers to recover said high boiling polyol and the desired range of fatty acid esters of said low molecular weight aliphatic alcohol.

4. A process as defined in claim 1 wherein the upper organic phase obtained at step (F) is subjected to reduced pressures and elevated temperatures for flash distillation of a majority of any mono-functional compounds present therein prior to step (G).

5. A process as defined in claim 1 wherein step (G) is conducted under a blanket of inert gas and step (H) consists of adding an azeotropic agent to the reaction mixture while maintaining the temperature thereof below about 300° C.

6. A process as defined in claim 1 wherein step (H) is terminated when a free acid content in the range of about 0.005 to 0.5 milliequivalents per gram of reaction mixture is attained.

7. A process as defined in claim 1 wherein step (J) comprises applying a vacuum in the range of 2 to 10 mm. Hg to the reaction mixture while substantially simultaneously maintaining the temperature thereof about below the boiling range of the fatty acid polyol esters.

8. A process as defined in claim 1 wherein the polyol is pentaerythritol.

9. A process as defined in claim 1 wherein the aliphatic alcohol is methanol.

10. A process of obtaining straight-chain monobasic fatty acid $C_1$ to $C_6$ esters from crude soap solutions of fatty acid products obtained from oxidation of $C_6$ through $C_{40}$ essentially linear hydrocarbons of an average molecular weight corresponding to hydrocarbons having 2 to 6 more carbon atoms than the fatty acid precursors of a desired range of fatty acid $C_1$ to $C_6$ esters, consisting essentially of feeding a crude soap solution of about 10% to 40% strength into a pressure vessel, mixing the crude soap solution with a hydrogenation catalyst, purging air from said vessel, adding hydrogen gas to said vessel to obtain a pressure in the range of about 350 to 650 p.s.i. within said vessel while substantially simultaneously raising the temperature within said vessel to about 190° C. to 300° C., maintaining said temperature and resultant pressure conditions within said vessel for a period of time ranging from about 10 to 60 minutes, slowly releasing the pressure and allowing volatiles to escape until a soap solution of about 50% to 85% strength is obtained, cooling the relatively concentrated soap solution to below about 70° C., removing the hydrogenation catalyst, adding 1 to 3 volume equivalents of a $C_1$ to $C_6$ aliphatic alcohol, reacting the resultant solution with a stoichiometric amount of sulfuric acid to form a sodium sulfate salt, allowing the sodium sulfate salt to precipitate and removing said salt from solution while maintaining the temperature thereof in the range of about 10° C. to 50° C., adding a relatively small amount of sulfuric acid to the solution to effect a phase separation therein, and decanting the top layer thereof containing the desired range of pure fatty acid esters of said $C_1$ to $C_6$ alcohol.

11. A method as defined in claim 10 wherein the mixing the organic layer with the sulfuric acid to form a two-layer system and separating the two formed layers of such system is repeated a plurality of times.

12. A method as defined in claim 11 wherein the repetition of mixing and separating is carried out by a counter-current flow process.

13. A method as defined in claim 10 wherein the $C_1$ to $C_6$ alcohol is methanol.

14. A method of purifying esters of synthetic fatty acids obtained by oxidation of $C_6$ through $C_{40}$ essentially linear hydrocarbons of an average molecular weight corresponding to hydrocarbons having 2 to 6 more carbon atoms than the fatty acid precursors of the desired range of fatty acid esters, consisting essentially of; mixing said esters with a relatively small amount of sulfuric acid of a strength ranging from about 60% to 94% so as to form a two-layer system, separating said layers whereby the lower layer contains sulfuric acid and a majority of any impurities in said esters and the upper layer contains a majority of said esters and an amount of impurities substantially smaller than the original amount of impurities.

15. A method as described in claim 14 wherein the process of admixing a relatively small amount of sulfuric acid and subsequent separating of the formed layers is repeated a plurality of times.

16. A method as described in claim 15 wherein the repetition is carried out by a counter-current flow process.

References Cited

UNITED STATES PATENTS

| | | | |
|---|---|---|---|
| 1,278,198 | 9/1918 | Oberfell et al. | 260—499 |
| 2,383,633 | 8/1945 | Trent | 260—410.9 |
| 2,783,270 | 2/1957 | Poly et al. | 260—485 |
| 2,987,536 | 6/1961 | Skees et al. | 260—451 |

FOREIGN PATENTS 6,067,711   8/1948   Great Britain.

LEWIS GOTTS, Primary Examiner

D. G. RIVERS, Assistant Examiner

U.S. Cl. X.R.

260—413, 451, 452, 488 F, 491, 499, 410.6